June 11, 1968 W. G. ROUTSON 3,387,630
ADJUSTABLE PRESSURE REDUCING DEVICE
Filed April 22, 1965 2 Sheets-Sheet 1

INVENTOR.
Willis G. Routson
BY
William R. Norris
ATTORNEY

June 11, 1968   W. G. ROUTSON   3,387,630
ADJUSTABLE PRESSURE REDUCING DEVICE
Filed April 22, 1965   2 Sheets-Sheet 2

INVENTOR.
Willis G. Routson
BY
William R. Norris
ATTORNEY

United States Patent Office 3,387,630
Patented June 11, 1968

3,387,630
ADJUSTABLE PRESSURE REDUCING DEVICE
Willis G. Routson, Walnut Creek, Calif., assignor to The Dow Chemical Company, Midland, Mich., a corporation of Delaware
Filed Apr. 22, 1965, Ser. No. 450,150
6 Claims. (Cl. 137—625.3)

ABSTRACT OF THE DISCLOSURE

Adjustable valves are provided for achieving a controlled, variable reduction in pressure on flowing fluids without excessive shearing of the fluid. These valves comprise a housing which defines a fluid flow path in which there is a porous bed. Adjacent the bed is a flexible diaphragm actuated by the introduction and removal of a fluid from a diaphragm chamber. The invention is based in part upon the discovery that as fluid flows through the valve housing the diaphragm will conform to a downstream portion of the porous bed. The length of the bed contacted, and thus the pressure drop across the valve, depends upon the amount of control fluid present in the diaphragm chamber. Various shapes and types of the porous beds are described, each giving the valve a unique operating characteristic.

---

The present invention concerns a novel valve for achieving a controlled, variable reduction in pressure on flowing fluids. The valve is especially useful for depressurizing polymer solutions with a minimum of incidental molecular degradation of the dissolved polymer.

It has been discovered that in reducing the pressure on polymer solutions, especially solutions of essentially linear, high molecular weight polymers, a sharp pressure gradient in the direction of solution flow, such as occurs in ordinary valves and orifices, results in substantial losses in the viscosity of the polymer solution. This is believed to be the result of molecular degradation of the polymer caused by energy expended in achieving the pressure reduction.

Recently, it has been demonstrated that the effects of pressure reduction on polymer solutions can be substantially alleviated by flowing the solution through a porous bed. In this manner, the desired pressure reduction is achieved over an extended pressure gradient in the direction of solution flow. This in turn minimizes molecular degradation of the dissolved polymer.

It would be desirable, and it is an object of the present invention, to provide a porous-bed, fluid depressurizing device in which the pressure reduction on a flowing fluid, especially, but no exclusively liquids, can be varied other than by design of the porous-bed. More particularly, it is an object of the invention to provide a porous-bed, pressure reducing valve in which the pressure drop and flow rate of a fluid, can be accurately controlled during use. Still another object is to provide means for achieving controlled pressure reduction on polymer solutions without molecular degradation of polymer solute. These objects, and other benefits as will become apparent hereinafter, are achieved in the present invention.

FIGURES 1–3 are schematic sectional views of an illustrative embodiment of the variable, pressure reducing, porous-bed valve of the invention. FIGURE 1 shows the valve in an open position, FIGURE 2 shows it partially closed, such that a desired pressure drop is achieved, and FIGURE 3 shows it in a closed position. FIGURE 4 is a sectional end view of the same valve in the closed position.

Figure 1:
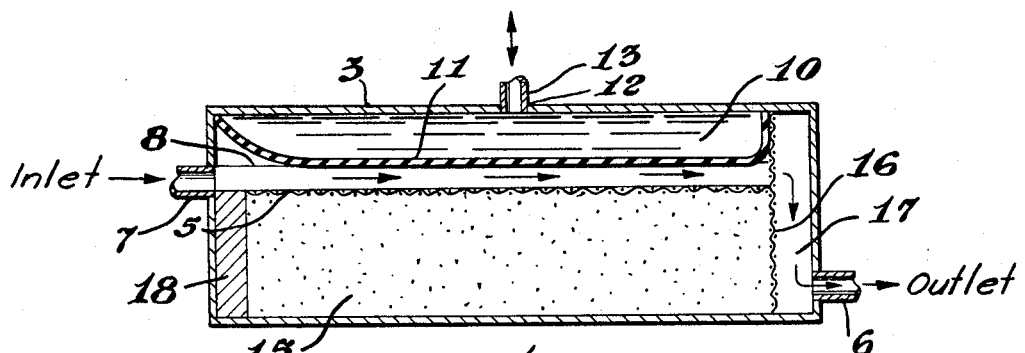

While the present invention has several distinct embodiments, each with its own inventive features, a fundamental embodiment of the invention involves an apparatus comprising a conduit housing adapted to receive through one opening a flowing fluid under pressure and at another opening, to discharge the fluid. Within the conduit housing and defining a flow path through the same is a porous-bed. That is, the porous-bed lies in the fluid flow path through the conduit. Along the fluid flow path within the conduit and adjacent the porous-bed is a pliable diaphragm which is a wall member of a pressure differential control chamber. Pressure control fluid is admitted to, or withdrawn from, this chamber through one or more vents therein, as required, to maintain the diaphragm against the porous-bed for some distance along the fluid flow path. While the length of the porous-bed is immaterial to the invention, the porous-bed will usually be at least about one inch long, and preferably about 12 to 84 inches long. As fluid flows through the conduit housing, it is forced through the portion of the porous-bed contacted by the pliable diaphragm. The length of the fluid flow path through the porous-bed and therefore the pressure differential across the device is adjusted by injecting different amounts of pressure control fluid in the pressure differential control chamber.

While the invention is useful as applied to gaseous fluids, it will be discussed herein, for the most part, with reference to liquids to which it is most advantageously applicable.

For further illustration of the invention, consider the embodiment of the above invention shown in FIGURES 1–4. Note, whenever possible hereinafter, the same reference members will be used to identify like components of the described apparatus in different figures.

This embodiment consists of a valve housing 3. Fluid enter the housing conduit 3 through inlet line 7 and exits through outlet line 6. The interior of the housing 3 is divided into two chambers. One chamber defines the fluid flow path through the valve as shown by the flow indicating arrows. This conduit chamber contains a porous-bed 15, which, in this particular illustration, is unconsolidated sand, the surface of which is held by a retaining screen 5. Adjacent the porous-bed 15 is a fluid tight, pressure differential control chamber 10 having a wall member in the form of an expandable diaphragm 11 facing the porous-bed 15. At the upper lateral edges of the porous-bed are curved gaskets 8 which mate in fluid sealing contact with the expanded shape of the diaphragm. A pressure control fluid, preferably a liquid, is introduced into, or withdrawn from, the diaphragm chamber 10 as necessary to maintain the expandable diaphragm 11 against the porous-bed 15. The liquid enters the diaphragm chamber 10 through one or more pressure control fluid openings such as vent 12. This is connected to a source of pressurized fluid, preferably a liquid reservoir under pressure, by means of pressure control fluid feed line 13. Lateral movement of the sand in the porous-bed 15 is prevented with a rigid retaining screen 16 at the outlet header zone 17.

This screen 16 also provides a barrier to prevent intrusion of the diaphragm 11 into the header zone 17.

Figure 2:
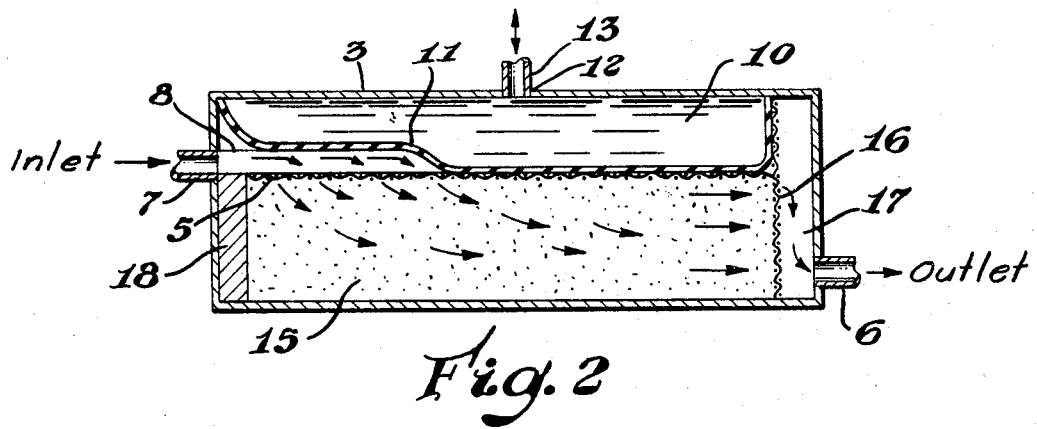

During operation, liquid under an elevated pressure flows into the valve housing 3 through inlet 7. It then may flow directly to the outlet without any significant pressure reduction as shown in FIGURE 1, when the valve is completely open. Alternately, the fluid may be diverted through a portion of the porous-bed 15 to ultimately discharge from outlet 6 as shown in FIGURE 2. This occurs when the pressure differential control chamber 10 contains sufficient pressure control fluid to force the diaphragm 11 against a lengthwise portion of the porous bed 15. The length of the average flow path of the liquid through the porous bed 15, and thus the pressure drop across the valve, is adjusted by introducing or withdrawing the pressure control fluid from the diaphragm chamber 10.

Figure 3:
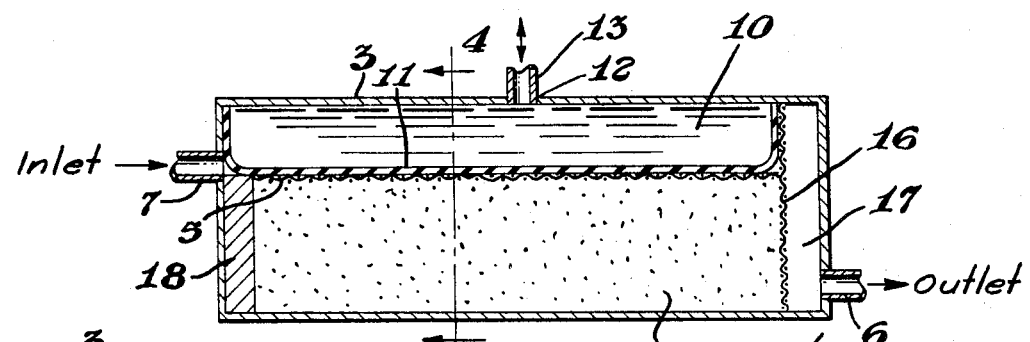
Figure 4:
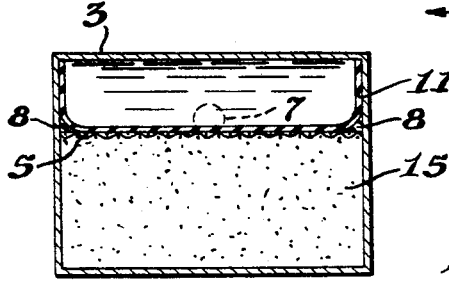

As the liquid is forced to flow through a greater portion of the porous-bed in the variable, pressure reduction valve, the pressure differential across the valve is increased. The opposite occurs when the average length of the flow path is decreased. In FIGURE 3, the valve is shown in a closed position. In this illustration, the pressure regulating diaphragm chamber 10 contains enough fluid to maintain the diaphragm 11 in sealing contact against the fluid impermeable block 18.

Figure 5:
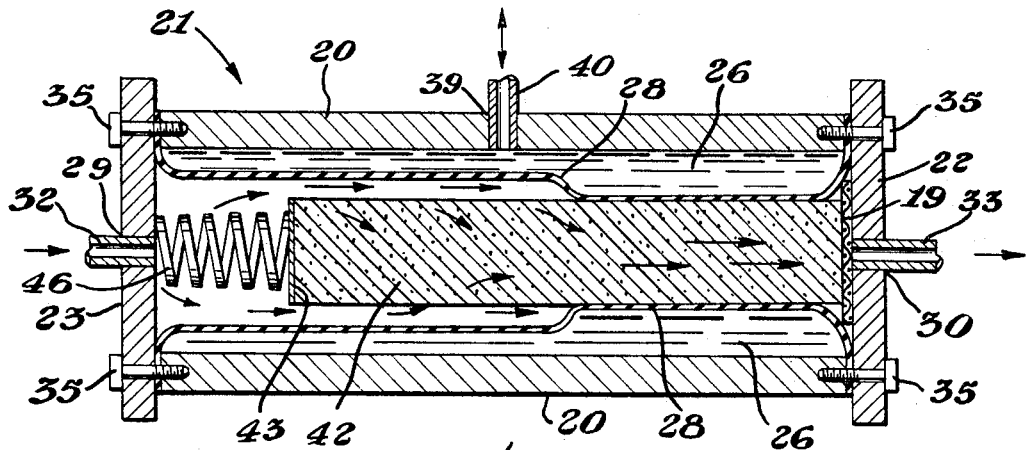
FIGURE 5 is a detailed sectional elevation of another embodiment of the invention utilizing a permeable core of consolidated particulate matter as the porous-bed and a surrounding diaphragm to control the length of exposed porous-bed.

FIGURE 5 shows a more complex, but the preferred embodiment of the invention. It shows a housing conduit 21 consisting of a valve housing 20 in the form of a cylinder with an inlet end plate 23 and an outlet end plate 22 with fluid passages 29 and 30, respectively, for connecting the valve with a fluid feed line 32 and fluid discharge line 33. Forming an annular diaphragm chamber 26 within the valve housing is a pliable, expandable diaphragm sleeve 28. The annular diaphragm chamber 26 is conventiently formed by positioning a rubber tube within the valve housing 20 extending just slightly beyond each end thereof. The ends of the rubber tube are flared out so as to provide a gasket between the end plates 23 and 22 and the valve housing 20. The end plates 23 and 22 are held in place by any convenient fastening means such as the illustrated tap screws 35. Communicating with the interior of the annular diaphragm chamber 26 through a pressure control vent 39 in the valve housing 20 is a pressure control, fluid feed line 40.

Within the inner conduit formed by the pliable, expandable diaphragm sleeve 28 is positioned a liquid permeable, cylindrical porous-bed 42, which in this particular embodiment is a standstone core. The porous-bed 42 butts against an outlet header screen 19 seated against the outlet end plate 22. It is maintained in this position by means of a compression spring 46 butting against the inlet end plate 23 and acting on and through an optional liquid impermeable, facing plate 43. The spring may be omitted since fluid pressure will force the porous bed rearward in the valve housing. The porous-bed 42 is large enough in circumference that when centrally positioned within the conduit formed by the diaphragm sleeve 28, the sleeve acting under the pressure of pressure control fluid contained in the diaphragm chamber 26, will make uniform circumferential contact with the porous-bed 42.

When the valve is in use, liquid flows into the valve at an elevated pressure on the upstream side of the porous-bed 42. The resulting pressure against the pliable, expandable diaphragm sleeve 28 transmits the same pressure throughout the pressure control fluid within the annular diaphragm chamber 26. Since there is a substantial pressure drop in the liquid as it flows through the porous-bed 42, the diaphragm sleeve 28 is caused to extend to uniform peripheral contact with the porous-bed 42, at the rearward, or downstream, end of the valve housing 20. As the volume of pressure control fluid in the closed annular chamber 26 is increased and the length of peripheral contact area between the porous-bed 42 and the diaphragm sleeve 28 is increased, an increase in length of the average flow path of the liquid through the porous-bed 42 occurs. This increases the pressure drop in liquid flowing through the valve. By reducing the volume of pressure control fluid in the annular diaphragm chamber 26, the pressure drop across the valve is reduced. When enough pressure control fluid is forced into the annular diaphragm chamber 26 to cause complete peripheral, surface contact between the diaphragm sleeve 28 and the permeable core 42, inclusive of sealing contact with facing plate 43, liquid flow through the valve is cut off.

Figure 6:
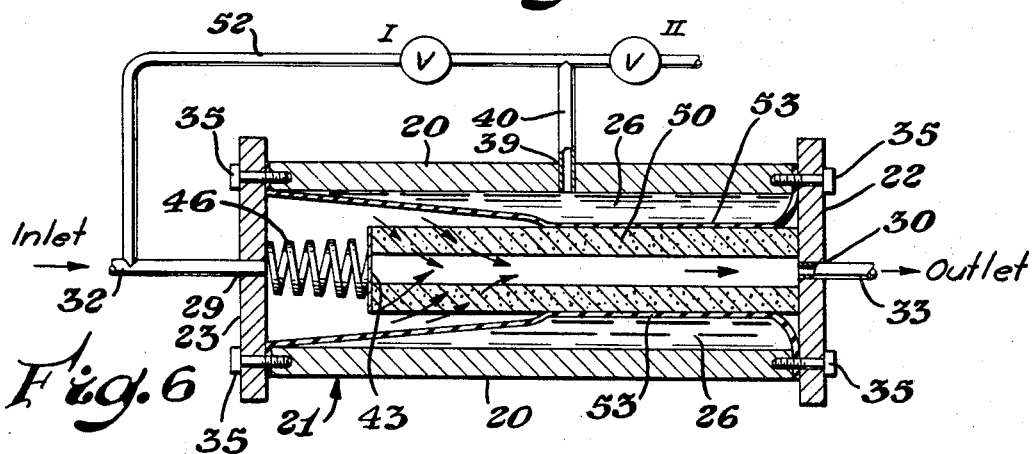
FIGURE 6 illustrates still another embodiment of a porous-bed valving device much like that shown in FIGURE 5 except that the porous-bed is a liquid permeable, hollow cylinder. With such a valve, the flow rate may be varied over a wide range without materially changing the pressure gradient in the device.

FIGURE 6 shows still another embodiment of the invention. It is similar to the embodiment shown in FIGURE 5 except that the liquid permeable porous-bed 50 is a hollow cylinder of sandstone and the expandable diaphragm 53 is normally tight on the porous-bed 50, by "normally tight" is meant the pliable diaphragm is of a size and shape such that the biasing, as by stretching, or resiliency of the diaphragm material normally maintains the material against the porous-bed surface. In this embodiment, the liquid on which the pressure is to be reduced has a flow path through the porous-bed 50, the length of which is essentially constant regardless of the extent of peripheral contact between the porous-bed 50 and the diaphragm sleeve 53. Pressure reduction across the valve can be achieved by decreasing the available area for liquid filtration through the porous-bed 50. This type of valve is most valuable in those applications wherein it is desired to maintain a given pressure drop over widely varying flow rates.

In the operation of the valves described herein, it is immaterial as to the source of pressure control fluid. It is only necessary, to operate the valves in accordance with the invention, that means for providing such a fluid under pressure is available. The pressure control fluid may be either a gas or liquid. The latter being effectively non-compressible is preferred for positive control. There are several possible modes of introducing the pressure control fluid into or withdrawing the same from the closed diaphragm chamber.

One mode of operating valves, in which the diaphragm is normally tight on the porous-bed, requires no auxiliary source of pressure control fluid. Such a mode is illustrated in FIGURE 6. In effect, the pressure control liquid is borrowed from the stream on which pressure is to be reduced. To increase the pressure drop across the pressure reducing device, valve II is closed and valve I is opened to admit liquid from the in-flowing line into the annular diaphragm chamber 26 through bypass line 52 and thence feed line 40. If desired, the diaphragm chamber 26 may be nearly filled with such liquid. The pressure drop across the valve is readily decreased by closing valve I and exhausting pressure control liquid from the diaphragm chamber 26 through valve II. This is continued slowly until the desired pressure drop is achieved across the valve.

Figure 7:
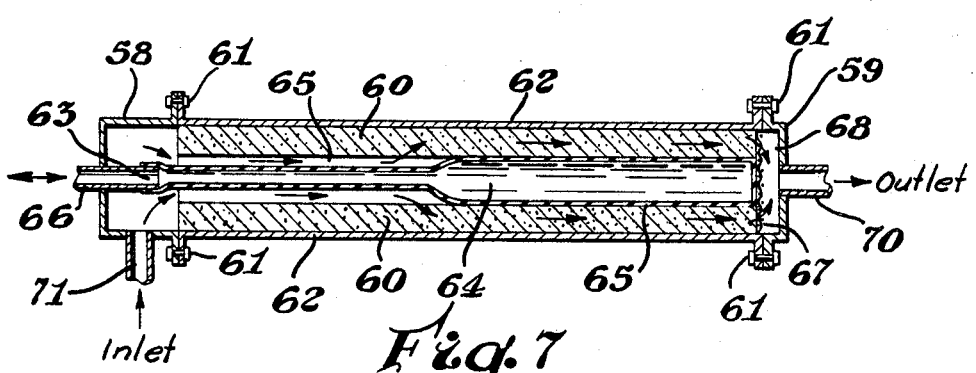
FIGURE 7 is another variable, porous-bed, valve in which fluid flow is diverted through an annularly disposed, liquid permeable porous-bed by means of an internal, fluid actuated balloon diaphragm.

FIGURE 7 illustrates still another embodiment of the invention wherein a consolidated sand porous-bed 60, in the shape of a hollow cylinder, is tightly inserted within a tubular valve housing 62. The valve housing 62 has an inlet 71 and outlet 70 in end closures 58 and 59 respectively. The end closures are fastened in fluid sealing contact to the valve housing 62 by any convenient means such as the bolt and nut assemblies 61 shown. The length of the liquid flow path through the porous-bed 60 is controlled by means of an internal elastic balloon diaphragm 65. This has an opening 63 connected to feed line 66 through which a pressure control fluid may be injected or withdrawn from the diaphragm chamber 64. At the discharge, or low pressure end of the valve, the porous-bed 60 and balloon diaphragm 65 butt against a rigid supporting grid 67. Liquid of reduced pressure flows into a common header 68 defined by the grid 67 and thence on into the outlet line 70.

As a pressure control fluid is injected or withdrawn from the diaphragm chamber 64, the diaphragm 65 expands or contracts thereby controlling the length of the average flow path for liquid flowing through the porous-bed 60 as shown by the arrows.

If desired, the valve shown in FIGURE 7 can be made to operate in a manner similar to that of the valve as shown in FIGURE 6 by using a hollow porous-bed 60 of smaller overall diameter than the inside diameter of the valve housing 62. This leaves an annular space in which depressurized fluid may flow. Thus, the length of the fluid flow path through the porous-bed 60 is essentially independent of the extent of contact between it and the diaphragm 65.

As will be apparent to those skilled in the art, the valves of the present invention can be adapted for use in a number of fluid flow control systems. In as much as the valves have pneumatic or hydraulic actuated controls, they can be readily automated.

Illustratively, pressure sensors are installed upstream and downstream from the valve. The pressure differential measured between these sensors can be fed to a set point controller which in turn controls the injection and withdrawal of pressure control fluid from the diaphragm chamber. Controlling a valve having a hollow porous-bed, as shown in FIGURE 6, in this manner enables the maintaining of an essentially constant and predetermined pressure drop over widely varying flow rates.

What is claimed is:

1. A valve which comprises a housing conduit having a flow path for a flowing fluid under pressure, a cylindrical, consolidated porous-bed of constant dimensions permeable to the fluid and a pressure differential control chamber having a vent for the admitting and withdrawing of pressure control fluid and having a wall member in the form of an expandable sleeve diaphragm, said porous bed having means at its upstream end to block fluid flow into the end of the porous bed and said porous bed lying in the fluid flow path through the housing conduit and within the expandable sleeve diaphragm, such that upon introduction of a pressure control fluid into the pressure differential control chamber, when fluid is flowing through the valve, the expandable sleeve diaphragm is maintained against the periphery of the porous-bed for some distance along the fluid flow path thereby limiting the fluid flow path along such distance to the porous-bed.

2. A valve as in claim 1 having a porous-bed in the form of a core of consolidated particulate matter at least one inch long.

3. A valve as in claim 2 having a compression spring acting on the porous-bed to maintain it in position at the outlet end of the housing conduit.

4. A valve as in claim 2 having a porous-bed in the form of a hollow cylinder closed at its upstream end.

5. A valve which comprises a housing conduit having a flow path for a flowing fluid under pressure, a consolidated porous-bed of constant dimensions permeable to the fluid, in the form of a hollow cylinder and a pressure differential control chamber in the form of an expandable, balloon with a vent for the admitting and withdrawing of pressure control fluid, said porous-bed having means at its upstream end to block fluid flow into the end of the porous bed and said porous bed lying in the fluid flow path through the housing conduit with the expandable balloon being positioned and maintained within the porous-bed, such that upon introduction of pressure control fluid into the balloon, when fluid is flowing through the valve, the balloon is forced against the porous-bed for some distance along the fluid flow path thereby limiting the fluid flow path along such distance to the porous-bed.

6. A valve as in claim 5 having a porous-bed in the form of a hollow cylinder of consolidated particulate matter at least one inch long.

References Cited

UNITED STATES PATENTS

| 994,167 | 6/1911 | Koppitz | 251—5 |
| 2,467,150 | 4/1949 | Nordell | 251—5 X |
| 2,988,222 | 6/1961 | Hagdahl | 210—350 |
| 3,060,966 | 10/1962 | Ratelband | 251—5 X |
| 3,170,872 | 2/1965 | Balogh et al. | 210—287 X |
| 3,180,825 | 4/1965 | Couvreur et al. | 210—350 X |

FOREIGN PATENTS 824,365  11/1959  Great Britain.

REUBEN FRIEDMAN, *Primary Examiner.*

J. ADEE, *Assistant Examiner.*